United States Patent
Pauly et al.

(10) Patent No.: US 10,146,217 B2
(45) Date of Patent: Dec. 4, 2018

(54) CONTROLLING REAL WORLD OBJECTS IN AN INDUSTRIAL INSTALLATION

(71) Applicant: ABB Schweiz AG, Baden (CH)

(72) Inventors: Thomas Pauly, Väserås (SE); Hans Thilderkvist, Malmö (SE); Jeff Harding, Holly Springs, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/509,561

(22) PCT Filed: Sep. 15, 2014

(86) PCT No.: PCT/EP2014/069608
§ 371 (c)(1),
(2) Date: Mar. 8, 2017

(87) PCT Pub. No.: WO2016/041571
PCT Pub. Date: Mar. 24, 2016

(65) Prior Publication Data
US 2017/0300042 A1 Oct. 19, 2017

(51) Int. Cl.
| | |
|---|---|
| *H04L 29/08* | (2006.01) |
| *H04L 29/06* | (2006.01) |
| *H04L 12/64* | (2006.01) |
| *G05B 19/418* | (2006.01) |
| *G06F 17/30* | (2006.01) |
| *G06F 21/12* | (2013.01) |

(52) U.S. Cl.
CPC ... *G05B 19/4186* (2013.01); *G06F 17/30867* (2013.01); *G06F 21/121* (2013.01); *G05B 2219/32161* (2013.01); *G05B 2219/33148* (2013.01); *Y02P 90/18* (2015.11); *Y02P 90/185* (2015.11); *Y02P 90/20* (2015.11)

(58) Field of Classification Search
None
See application file for complete search history.

(56) References Cited

U.S. PATENT DOCUMENTS

| | | |
|---|---|---|
| 2002/0184348 A1 | 12/2002 | Rapp et al. |
| 2012/0226368 A1 | 9/2012 | Thomson et al. |
| 2014/0336786 A1* | 11/2014 | Asenjo ............... G05B 19/4185 700/17 |

FOREIGN PATENT DOCUMENTS

WO 2010083889 A1 7/2010

OTHER PUBLICATIONS

International Preliminary Report on Patentability Application No. PCT/EP2014/069608 Completed Date: Aug. 11, 2016, 6 Pages.
(Continued)

*Primary Examiner* — Alexander Lagor
(74) *Attorney, Agent, or Firm* — Whitmyer IP Group LLC

(57) ABSTRACT

A method for controlling real world objects in an industrial installation, which is performed in a server node and includes the steps of: receiving a connection establishment request having a user identity; authenticating the user identity; establishing a connection; receiving a service request, wherein the service request includes a reference to an aspect object and a reference to an aspect of the aspect object; forwarding the service request and the user identity to a service dispatcher module; determining a target service provider from the reference to the aspect object by querying a directory server module; and sending the service request and the user identity to the target service provider.

23 Claims, 7 Drawing Sheets

(56) References Cited

OTHER PUBLICATIONS

Internation Search Report & Written Opinion Application No. PCT/EP2014/069608 Completed: May 28, 2015; dated Jun. 11, 2015, 11 Pages.

\* cited by examiner

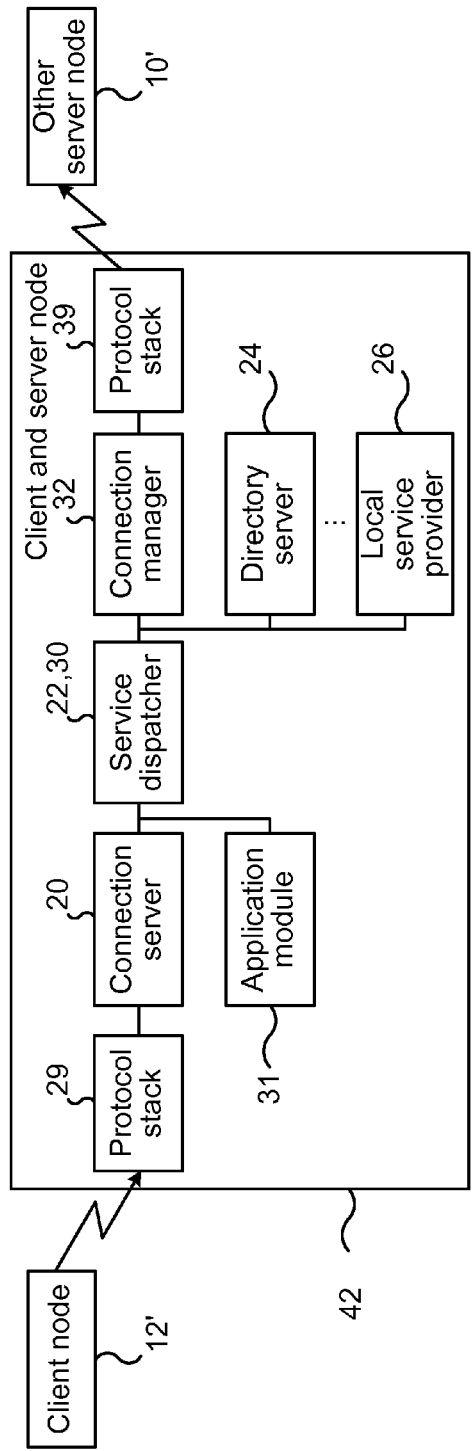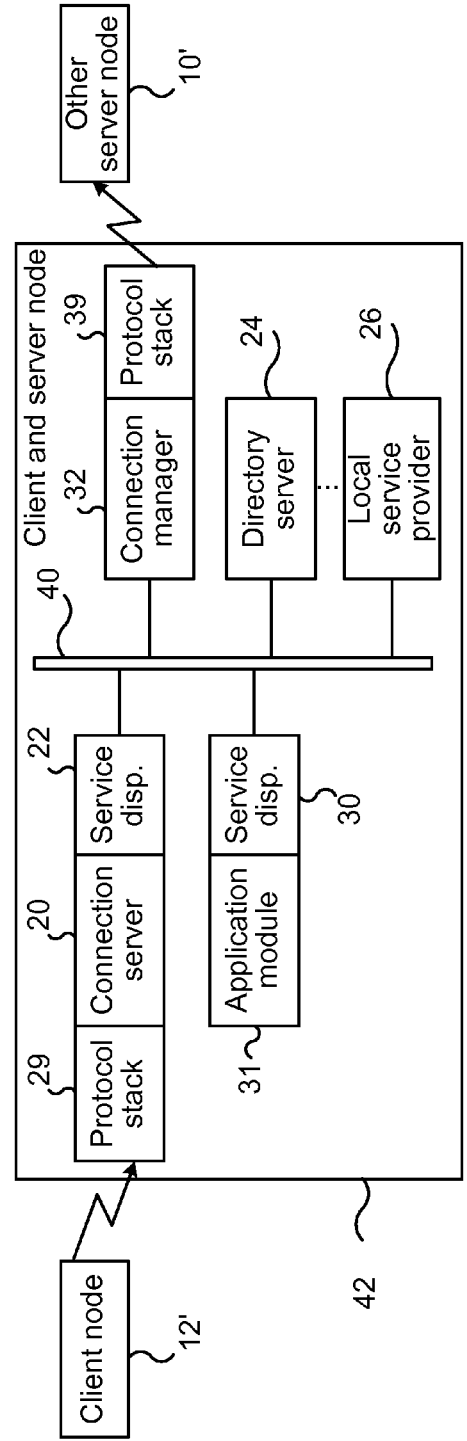

CONTROLLING REAL WORLD OBJECTS IN AN INDUSTRIAL INSTALLATION

TECHNICAL FIELD

The invention relates to methods, a server node, a client node, computer programs and computer program products for controlling real world objects in an industrial installation.

BACKGROUND

Automation systems are dedicated systems used to control industrial manufacturing processes in industrial installations e.g. for oil refining, petrochemicals, chemicals, fertilizers, pharmaceuticals, food and beverage manufacturing, power generation, cement production, steelmaking, and papermaking.

Automation systems can be connected to sensors and actuators and use sequential logic and setpoint control to control the flow and processing of material through the plant. A common example is a setpoint control loop comprising a pressure sensor, controller, and control valve. Pressure or flow measurements are transmitted to the system, usually through the aid of a signal conditioning input/output (I/O) unit. When the measured variable reaches a certain point, the system instructs a valve or actuation device to open or close until the fluidic flow process reaches the desired setpoint.

A process plant can have many thousands of I/O units. Processes are not limited to fluidic flow through pipes, but also include other aspects such as paper manufacturing apparatuses and their associated quality controls, variable speed drives, motor control centres, cement kilns, mining operations, ore processing facilities, various discrete manufacturing machines, and many others.

Besides operations for controlling a process, automation systems normally also include monitoring and supervisory operations, including operations for generating events dependent on various conditions related to the controlled and supervised process. Other sources of events include software applications such as applications for condition monitoring, optimization, calculations etc. Events can be stored in one or more event logs for later retrieval for presentation to users as event lists, and for various other operations such as analysis of causes of events, etc. Events may also be used to generate alarms.

Automation systems typically also include operations for collecting and storing historical data. Historical data are series of values representing the development of process variables (such as measurements) over time. Other sources of historical data include software applications such as applications for condition monitoring, optimization, calculations etc. Historical data are stored for later retrieval for presentation to users as trend charts or in other forms, and for further processing by other applications, such as for analysis and tuning of the controlled process.

In summary, a modern advanced process automation system is quite complex. To make it manageable to develop and maintain and easy and intuitive to use, an efficient software infrastructure is needed, that provides means for effective integration of many and varying software applications, and allows users to navigate smoothly and seamlessly between these applications.

The international standard IEC 81346-1 "Industrial systems, installations and equipment and industrial products—Structuring principles and reference designations" provides a basis for establishing models of industrial plants, machines, buildings etc., by specifying principles for structuring of objects including associated information. In this standard, the term "object" means an entity treated in a process of development, implementation, usage and disposal, and may refer to a physical or non-physical entity, i.e. anything that might exist, exists, or did exist. An "object" according to IEC 81346-1 has information associated to it.

Most objects according to IEC 81346-1 have a physical existence as they are tangible (e.g. motor, pump, valve, building, etc.). However, there are objects that are not tangible but exist for different purposes, for example an object that exist only by means of the existence of its sub-objects, i.e. it is defined for structuring purposes (such as a system); or an object that exists for identification of a set of information.

IEC 81346-1 does not distinguish between objects that have a physical existence and those that don't. Both kinds are relevant for being identified and handled in the life-cycle of a system.

When describing the interior of an object and its interrelations to other objects, it is useful to look at the object from different views. In IEC 81346-1, these different views of an object are called "aspects". The aspects dealt with in IEC 81346-1 are focused on: what an object is intended to do or what it actually does—the operation aspect; by which means an object does what it is intended to do—the product aspect; and intended or actual space of the object—the location aspect.

Object linking and embedding for Process Control Unified Architecture (OPC UA) is a specification from the OPC Foundation that provides a cross-platform service-oriented architecture for process control. In contrast to its predecessor (commonly referred to as Classic OPC), OPC UA is platform independent.

US 2012/226368 A1 discloses systems and methods for dynamic reconfiguration of an application of a programmable process controller. According to one embodiment, a configuration device reads a new configuration file, which contains information regarding a desired number of instances and desired configurations of modules of the process control application, from its local memory. The configuration device then causes the application to instantiate the desired number of instances with the desired configurations by replacing an existing configuration file of the programmable process controller with the new configuration file.

WO 2010/083889 A1 discloses a method for obtaining authentication information to enable a user to access a secure service provided by a service provider. The service provider redirects the user to an identity provider, providing a virtual address for the identity provider.

US 2002/184348 A1 discloses an object oriented sensing/control framework architecture includes a sensor/controller framework module, an application services framework module, a signal database, and an application database.

SUMMARY

One object is to provide an efficient structure to support communication between client nodes and server nodes for use in control of real world objects in an industrial installation.

According to a first embodiment, it is presented a method for controlling real world objects in an industrial installation. The method is performed in a server node and comprises the steps of: receiving, in a connection server module, a connection establishment request comprising a user identity; authenticating, in the connection server module, the user identity; establishing, in the connection server module, a connection and associating the connection with the user identity, only when the authentication is successful; receiving, in the connection server module, a service request on the established connection, wherein the service request comprises a reference to an aspect object and a reference to an aspect of the aspect object, wherein the aspect object is a software object representing one of the real world objects, and the aspect defines an operation associated with the real world object; forwarding, in the connection server module, the service request and the user identity to a service dispatcher module; determining, in the service dispatcher module, a target service provider from the reference to the aspect; and sending, in the service dispatcher module, the service request and the user identity to the target service provider.

According to a second embodiment, it is presented a server node for controlling real world objects in an industrial installation. The server node comprises: a processor; and a memory storing a connection server module and a service dispatcher module. The connection server module stores instructions that, when executed by the processor, causes the server node to: receive a connection establishment request comprising a user identity; authenticate the user identity; establish a connection and associating the connection with the user identity, only when the authentication is successful; receive a service request on the established connection, wherein the service request comprises a reference to an aspect object and a reference to an aspect of the aspect object, wherein the aspect object is a software object representing one of the real world objects, and the aspect defines an operation associated with the real world object; and forward the service request and the user identity to a service dispatcher module. The service dispatcher module stores instructions that, when executed by the processor, causes the server node to: determine a target service provider from the reference to the aspect; and send the service request and the user identity to the target service provider.

According to a third embodiment, it is presented a computer program for controlling real world objects in an industrial installation. The computer program comprises computer program code which, when run on a server node causes the server node to: receive, in a connection server module, a connection establishment request comprising a user identity; authenticate, in the connection server module, the user identity; establish, in the connection server module, a connection and associating the connection with the user identity, only when the authentication is successful; receive, in the connection server module, a service request on the established connection, wherein the service request comprises a reference to an aspect object and a reference to an aspect of the aspect object, wherein the aspect object is a software object representing one of the real world objects, and the aspect defines an operation associated with the real world object; forward, in the connection server module, the service request and the user identity to a service dispatcher module; determine, in the service dispatcher module, a target service provider from the reference to the aspect; and send, in the service dispatcher module, the service request and the user identity to the target service provider.

According to a fourth embodiment, it is presented a computer program product comprising a computer program according to the third embodiment and a computer readable means on which the computer program is stored.

According to a fifth embodiment, it is presented a method for controlling real world objects in an industrial installation. The method is performed in a client node and comprises the steps of: receiving, in a service dispatcher module, a service request from an application module of the client node, wherein the service request comprises a reference to an aspect object and a reference to an aspect of the aspect object, wherein the aspect object is a software object representing one of the real world objects, and the aspect defines an operation associated with the real world object; determining, in the service dispatcher module a location of a server node based on the reference to the aspect object and the reference to the aspect; forwarding, in the service dispatcher module, the service request, a reference to the location of the server node and a user identity to a connection manager module; checking, in the connection manager module, if a connection is established with the server node; sending, in the connection manager module, a connection establishment request comprising the user identity when no connection is established with the server node; and sending, in the connection manager module, the service request to the server node when a connection with the server node is established.

According to a sixth embodiment, it is presented a client node for controlling real world objects in an industrial installation. The client node comprises: a processor; and a memory storing a service dispatcher module and a connection manager module. The service dispatcher module stores instructions that, when executed by the processor, causes the client node to: receive a service request from an application module of the client node, wherein the service request comprises a reference to an aspect object and a reference to an aspect of the aspect object, wherein the aspect object is a software object representing one of the real world objects, and the aspect defines an operation associated with the real world object; determine a location of a server node based on the reference to the aspect object and the reference to the aspect; and forward the service request, a reference to the location of the server node and a user identity to a connection manager module. The connection manager module stores instructions that, when executed by the processor, causes the client node to: check if a connection is established with the server node; send a connection establishment request comprising the user identity when no connection is established with the server node; and send the service request to the server node when a connection with the server node is established.

According to a seventh embodiment, it is presented a computer program for controlling real world objects in an industrial installation. The computer program comprises computer program code which, when run on a client node causes the client node to: receive, in a service dispatcher module, a service request from an application module of the client node, wherein the service request comprises a reference to an aspect object and a reference to an aspect of the aspect object, wherein the aspect object is a software object representing one of the real world objects, and the aspect defines an operation associated with the real world object; determine, in the service dispatcher module a location of a server node based on the reference to the aspect object and the reference to the aspect; forward, in the service dispatcher module, the service request, a reference to the location of the server node and a user identity to a connection manager module; check, in the connection manager module, if a connection is established with the server node; send, in the connection manager module, a connection establishment request comprising the user identity when no connection is established with the server node; and send, in the connection manager module, the service request to the server node when a connection with the server node is established.

According to an eighth embodiment, it is presented a computer program product comprising a computer program according to the seventh embodiment and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 7 is a schematic diagram where a client and server node combines the functionality of both a client node and a server node of FIG. 6;

FIG. 8 is a schematic diagram illustrating a client and server node similar to the client and server node of FIG. 7 in an embodiment with a multi-process implementation;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
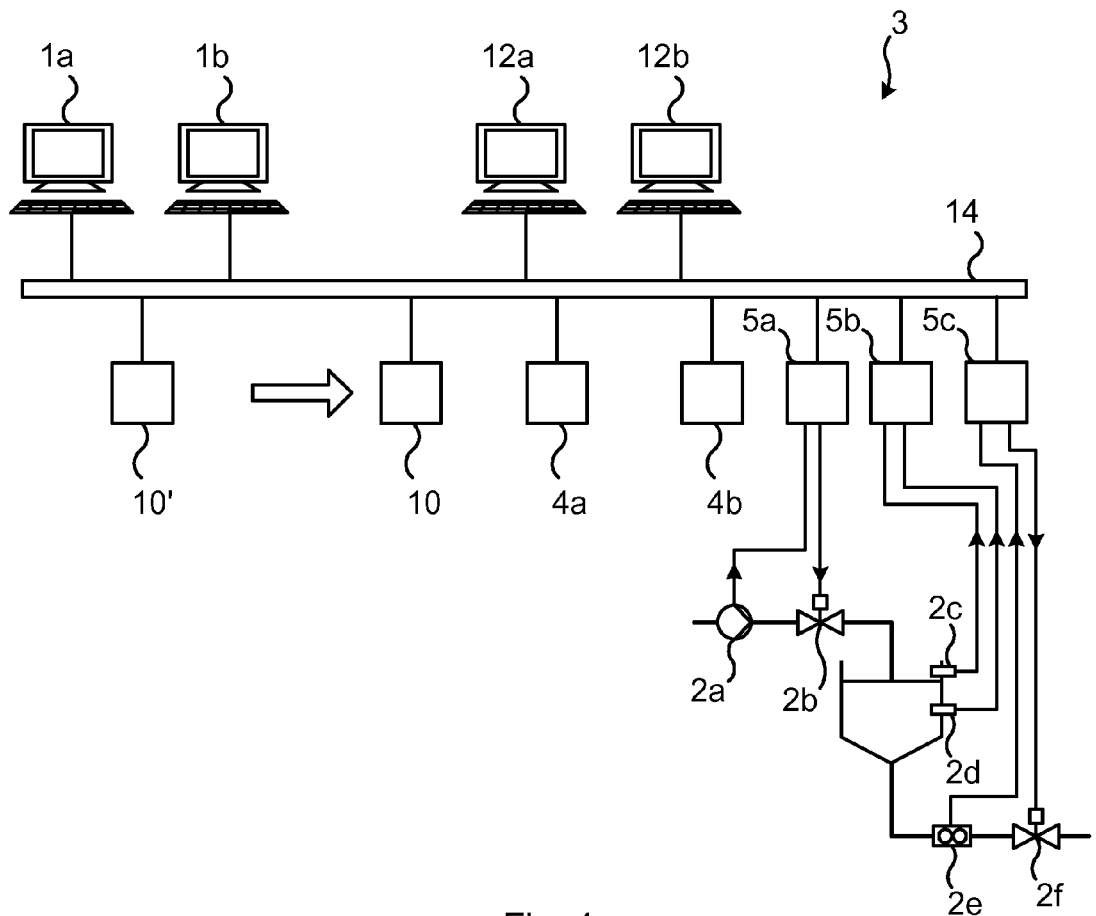
FIG. 1 is a schematic diagram illustrating an environment where embodiments presented herein can be applied.

FIG. 1 is a schematic diagram illustrating an environment where embodiments presented herein can be applied.

Automation systems can be complex and comprise a number of different types of computers and other devices. Such a system comprises controllers 4a-b, servers 10, 10' and workstations 12a-b connected to a system network 14 for control of an industrial installation 3. Servers are computers that include software that provides various forms of system functionality, such as history logs, alarm and event handling, calculations, process optimization, etc. Workstations are client nodes being e.g. stationary computers, laptop computers or even tablet computers or smartphones that include software that provides various forms of user interaction, such as process graphics, faceplates, alarm and event lists, trend curves, etc. Controllers are computers that include software that performs the actual control operations, such as proportional, integral, and derivative (PID) control, logic and sequential control, various calculations, and in many cases also advanced process control such as model based predictive control, fuzzy control, etc. Via IO units 5a-c or field communication interfaces, real world objects 2a-f such as sensors and actuators are connected for measuring and affecting various forms of process variables, such as temperature, flow, pressure, level, position, etc. The system network 14, can e.g. be a local area network such as an Ethernet network.

The structure of FIG. 1 is only an example and variations are of course possible. For example, server and client functionality may reside in the same computer, and/or server and control functionality, or any other combination.

Automation systems are typically delivered with a set of generic and configurable software operations for controlling and monitoring the process. This makes it possible to configure the automation system for controlling a specific process without the need for low level programming. The activity to configure the automation system software for a specific application, i.e. to control a specific process, is commonly referred to as engineering, and is typically performed on an engineering workstation 1a-b in co-operation with an engineering server 10'. Engineering also includes defining the automation system itself, including IO units 5a-c, controllers 4a-b, servers 10, 10', and client nodes 12a-b and how these are connected to each other over a system network 14 or otherwise. Engineering is done by means of various engineering tools that are used to create and modify configuration data for the automation system. Examples of configuration data include control programs, graphics for operator interaction, parameters for history logs and for the collection and treatment of historical data, settings for input-output (IO) modules, etc. Once defined, the configuration of the system is deployed from the engineering server 10' to the runtime server 10, as indicated by the arrow between the engineering server 10' and the runtime server 10.

Figure 2:
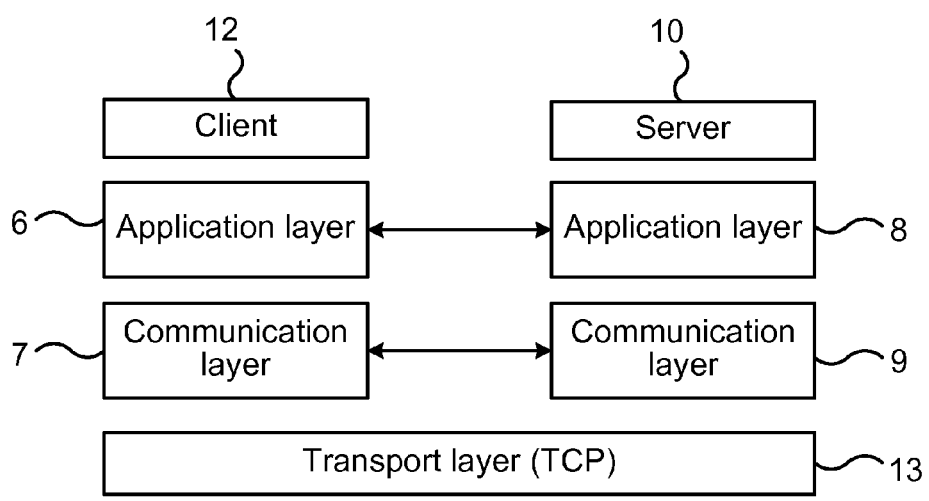
FIG. 2 is a schematic diagram illustrating a communication structure for OPC UA.

FIG. 2 is a schematic diagram illustrating a communication structure for OPC UA.

OPC UA specifies i.a.: an information model to represent structure, behaviour and semantics of the information exchange, a message model for the interaction between applications, a security model for authentication of clients, servers and users, and for the integrity and confidentiality of their communications, a communication model to transfer the data between end-points and a conformance model to guarantee interoperability between systems.

At the lowest layer there is a transport layer 13, e.g. implemented using TCP (Transport Control Protocol) over IP (Internet Protocol) using e.g. Ethernet or any of the IEEE 802.11 standards as a bearer.

The OPC UA communication model defines two layers above the transport layer 13. A first layer is the communication layer implemented by a client communication layer 7 in a client node 12 and a server communication layer 9 implemented in server node 10. The communication layer provides security mechanisms that meet confidentiality and integrity requirements. This is done by providing a secure channel between the client node 12 and the server node 10. Messages sent on this secure channel are encrypted and signed.

A second layer is the application layer implemented by an application layer 6 in the client 12 and an application layer 8 in the server. The application layer provides user authentication and communication of service requests and responses. It does this by establishing and activating an application session that identifies the user of the client node 12. All subsequent service requests by the same user are made in the context of this application session. Service is herein to be construed as an operation or a defined functionality provided by a server, which can be invoked from another entity, a client. The client is a separate module from the server and can be located in a different device, remote from the device housing the server, or within the same device housing the server.

Figure 3:
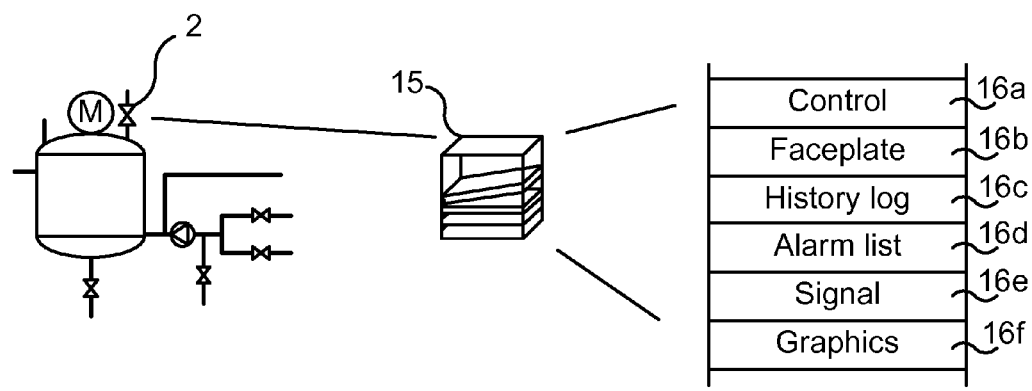
FIG. 3 is a schematic diagram illustrating the use of an aspect object to represent a real world object.

FIG. 3 is a schematic diagram illustrating the use of an aspect object 15 to represent a real world object 2. Real world objects 2 controlled and managed by the automation system are of many different kinds. They can be physical process objects, like a sensor, valve or motor, or more complex entities like a production cell or a reactor. They can also be immaterial, like a control loop or a recipe. They can be units or operations in the automation system, like an IO unit, a server, or an operator's workplace, etc. These real world objects 2 are represented in the automation system as aspect objects 15.

The "interior" of each real world object 2 is described from several different perspectives, each perspective dealing with certain information, behaviour and functionality related to the object. In the automation system these different perspectives are modelled as different aspects 16*a*-*f* of the aspect object 15.

One example is an aspect object representing a control valve. One aspect 16*a* of the valve may be its associated control operation. Another aspect 16*b* may be a faceplate for operator interaction. A third aspect 16*c* may be a history log of the signal that controls the physical valve. A fourth aspect 16*d* may be an alarm list containing alarms associated with the valve. A fifth aspect 16*e* may be a signal aspect, defining signals representing the inputs and outputs that the valve is connected to. A sixth aspect 16*e* may be a graphic for the real world object when represented on a computer screen, etc. Different aspect objects can have different associated aspects.

Different aspects are modelled separately and independently from other aspects, and can be implemented by different system components. The aspect object 15 serves as a container that includes these independent models—the aspect object 15 in itself contains very little information and functionality.

An aspect thus defines information and functionality related to a certain perspective of some class of real world objects. The aspect may also define operations, by which parts of its functionality can be invoked. Examples of operations that an aspect may define include read data, write data, acknowledge alarm, submit event, etc. More examples are shown in Table 1.

TABLE 1

Examples of operations of aspects of aspect objects

| Service Group | Operation | Description |
|---|---|---|
| Directory Services | Browse | Browsing server name space |
| | Name Resolution | Given a Name or ID returns an access path. |
| | Object Location Lookup | Determine the location of aspect objects |
| Data Access Services | Data Read | Read one or more data values |
| | Data Write | Write one or more values to data |
| | Data Subscribe | Establish a subscription for data |
| | Data Unsubscribe | Terminate a subscription |
| | Publish | Send data updates for a subscription |
| Alarm & Event Services | Alarm & Event Subscribe | Establish a subscription for delivery of alarm and event data from a server |
| | Alarm & Event Unsubscribe | Terminate a subscription |
| | Alarm & Event Publish | Send event notifications for a subscription |
| History Services | History Read | Read historical data Read historical events |
| | History Update | Insert historical data Update historical data Delete historical data |
| Remote Method Call | Generate Event | Submit an event |
| | Alarm Commands | Enable, disable, acknowledge, or shelve an alarm |
| | Batch commands | Schedule recipe, Phase commands |
| | Equipment commands | Reserve/release equipment |
| | Tuning commands | Store/Get/Delete tuned data |
| | Deploy commands | Control the deployment of configuration data |
| | . . . | . . . |
| File Services | Create and delete directory. Create, write, read, and delete file | Used to deploy configuration data and to distribute SW updates |

The concept of aspect objects allows many and different applications to cooperate in providing advanced and complex functionality that is intuitive and easy to use. The following example scenario illustrates this:

An operator supervises a process by watching a process graphics page. A real world object 2, being a valve in this example, which is controlled by the system goes into an alarm state. The valve is represented in the system as a composite object.

One of the aspects of this object is a graphics aspect 16*f* providing a graphical symbol that is presented on the graphics page. By right-clicking on that symbol the operator can select operations that are associated with different aspects of the object. The operator selects the faceplate. This causes the graphics package (in the client in this case) to invoke the operation "show" provided by the faceplate aspect 16*b* (the application providing the operation in this case) for the composite object that the operator clicked on.

The faceplate for the valve is now shown on the screen. A faceplate provides more detailed information and more interaction possibilities for an object than what is normally included in a process graphics page.

The operator right-clicks on the faceplate and selects the trend curve aspect that is associated with the object. This causes the faceplate framework to invoke the operation "show" provided by the trends package. The trends package presents the relevant trend curve on the screen, allowing the operator to further analyse the problem.

The operator concludes that the valve is malfunctioning. The operator changes the control mode for the valve to "manual" by clicking on a button of the valve's faceplate. This causes the faceplate framework to invoke the operation "write data" provided by a control connection application, with the parameter "mode" and value "manual".

The control connection application sends a message to a process controller that controls the valve, changing the control mode to "manual".

The operator can now manually position the valve by clicking on "increase" and "decrease" buttons on the faceplate. This causes the faceplate framework to invoke the operation "write data" provided by the control connection application, this time addressing the parameter "position" for the current object When satisfied, the operator right clicks on the object again, this time e.g. on the graphics page, and selects alarm acknowledgement. This causes the graphics package to invoke the "acknowledge alarm" operation, which is provided by the alarm management application, for the current object.

Finally the operator right-clicks on the object and selects the operation "maintenance". This causes the graphics package to invoke the operation "create maintenance order" which is provided by an asset management application.

The asset management application now presents a dialog where the operator can add comments to describe the nature of the problem. The asset management application then creates a maintenance order for the current object by sending a message to an external work order management system.

The operator can again right click on the object and select operating instructions, causing the faceplate framework to invoke the "show" operation of a document viewer such as Microsoft Word or Adobe Reader.

Each time any of these applications invokes a operation of any other application, it is done through an aspect of an aspect object, and each invocation is in the context of that object. One application is not aware of the identity or location of any other application, only of the operations that are defined by the aspect of the aspect object. How this is implemented is described in more detail below.

Through the integration of the aspect object concept with a service oriented mechanism for interaction between applications, the different applications together perform the many different operations that are associated with all aspects of all aspect objects, and thus the collective operations of the system for control and supervision of real world objects.

Configuration data can also be organised according to the principles of aspect objects. In our illustrative example, the aspect object 15 represents a control valve, for which configuration in the context of aspects will now be described. One aspect 16a of the valve is its associated control operation. The configuration data organized by this aspect includes the control program that performs this control operation, and some settings. Another aspect 16b of the valve is a faceplate for operator interaction. The configuration data organized by this aspect includes a description of the graphics of the faceplate and the association between dynamic fields and control operations of the faceplate and the corresponding variables exposed by the control operation. A third aspect 16c is a history log of the output signal that controls the physical valve. Configuration data held by this aspect includes the sampling interval and settings for data treatment. A fourth aspect 16d is an alarm list containing alarms associated with the valve. Configuration data held by this aspect includes parameters defining the look and behaviour of the alarm list. A fifth aspect 16e is a signal aspect, defining signals representing the inputs and outputs that the valve is connected to, etc.

Other aspect objects may represent parts of the automation system itself, such as servers and workstations, controllers and I/O units. Aspects on such objects organize configuration data such as network addresses and various other settings.

Configuration data also includes information about how aspect objects are related to each other, such as functional or locational relations. Further, it includes information about user authorities, i.e. which permissions are granted to users or user groups on each aspect object or group of aspect objects, and about required permissions for the operations that are defined by each aspect type. Note that users in this context may include software processes (programs) as well as human users.

Changes to configuration data done in the engineering section may be directly applied to the runtime section. Alternatively, configuration data is deployed from the engineering section to components of the runtime part in a distinct step after changes have been completed and satisfactorily verified.

Figure 4:
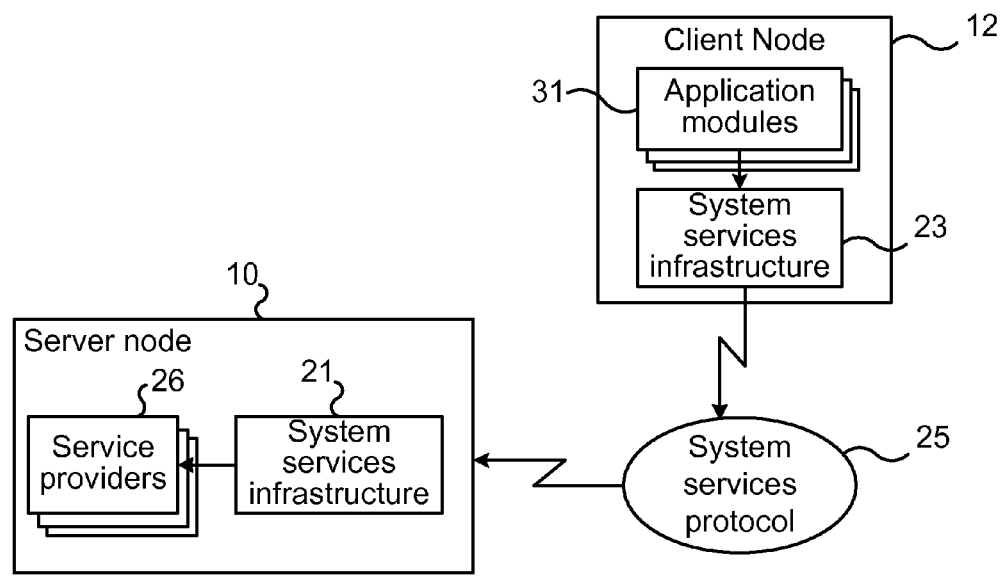
FIG. 4 is a schematic diagram illustrating a client-server view of the system of FIG. 1.

FIG. 4 is a schematic diagram illustrating a client-server view of the system of FIG. 1. A client node 12 communicates with a server node 10 using a system services protocol 25. In this way, in order for an application module 31 to access a service provider 26, the application module 31 connects via a client system services infrastructure 33, a system services protocol 25 and a server system services infrastructure 21 to the service provider 26 in question.

An application module 31 is a software module that uses system services to invoke operations of one or more service providers 26 to achieve various system functions. Examples include HMI (Human Machine Interface) presentation components and engineering configuration tools.

Software modules may act both as clients and service providers. Examples include process optimization applications and asset management applications.

Thus, interaction between application modules 31 and service providers 26 is handled through the system services infrastructure 33 of the client node, by which application modules 31 can invoke operations on aspect objects provided by service providers 26 by sending system service requests and receiving responses. The system services protocol 25 provides asynchronous message passing for transporting system service requests and responses between client node 12 and the server node 10.

It is to be noted that a physical device (workstation, server, etc.) can implement either or both of a client node 12 and a server node 10.

The distribution of functionality between the different components described in the following is particularly advantageous for a number of reasons.

Firstly, client nodes are able to invoke operations defined by aspects of aspect objects without either prior knowledge of, or the need to first determine, the identity and location of the service providers that provide these operations.

Secondly, an efficient flow of messages is provided by avoiding bottlenecks where much serial processing is done.

Thirdly, parallel execution for different modules is possible, thus allowing for an optimal use of modern multicore processor architectures.

Fourthly, new applications can be added that interact with existing ones, without the need to modify the existing applications.

The term module used here and throughout this document is to be construed as a software module that is distinct and distinguishable from other modules. The functions inside a module are semantically related and encapsulated by the module; thus modules are modular and cohesive. Different modules can typically execute in separate execution contexts. Each module can be executed in a different processor core and/or even different processor. Hence the capacity available for each module is independently configurable. Modules interact via interfaces and are substitutable, i.e. a new module can replace an existing one as long as it provides the original module's semantics via the same interfaces.

Figure 5:
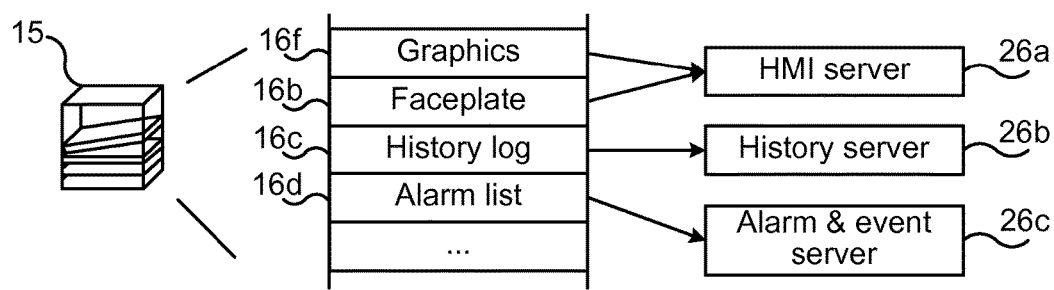
FIG. 5 is a schematic diagram illustrating how some aspects of FIG. 3 are mapped to service providers.

FIG. 5 is a schematic diagram illustrating how some aspects of FIG. 3 are mapped to service providers.

A service provider is a software module that provides a certain set of services (providing operations) in the system. As explained above, a service allows an application module in the client 12 to invoke an operation. Examples of service providers include a directory server, an HMI (Human Machine Interface) server 26a, a data server, an alarm and event server 26c, and a history server 26b. A service provider is associated with one or more aspects, in that it provides operations defined by those aspects. For instance, the process graphics aspect 16f and the faceplate aspect 16b are both mapped to the HMI server 26a, the history log aspect 16c is mapped to the history server 26b and the alarm list aspect 16d is mapped to the alarm and event server 26c. Each one of the HMI server 26a, history server 26b and alarm and event server 26c are service providers which are provided in one or more physical server nodes.

As explained before, Table 1 shows some examples of possible operations which can be made available through the system services described herein.

Figure 6:
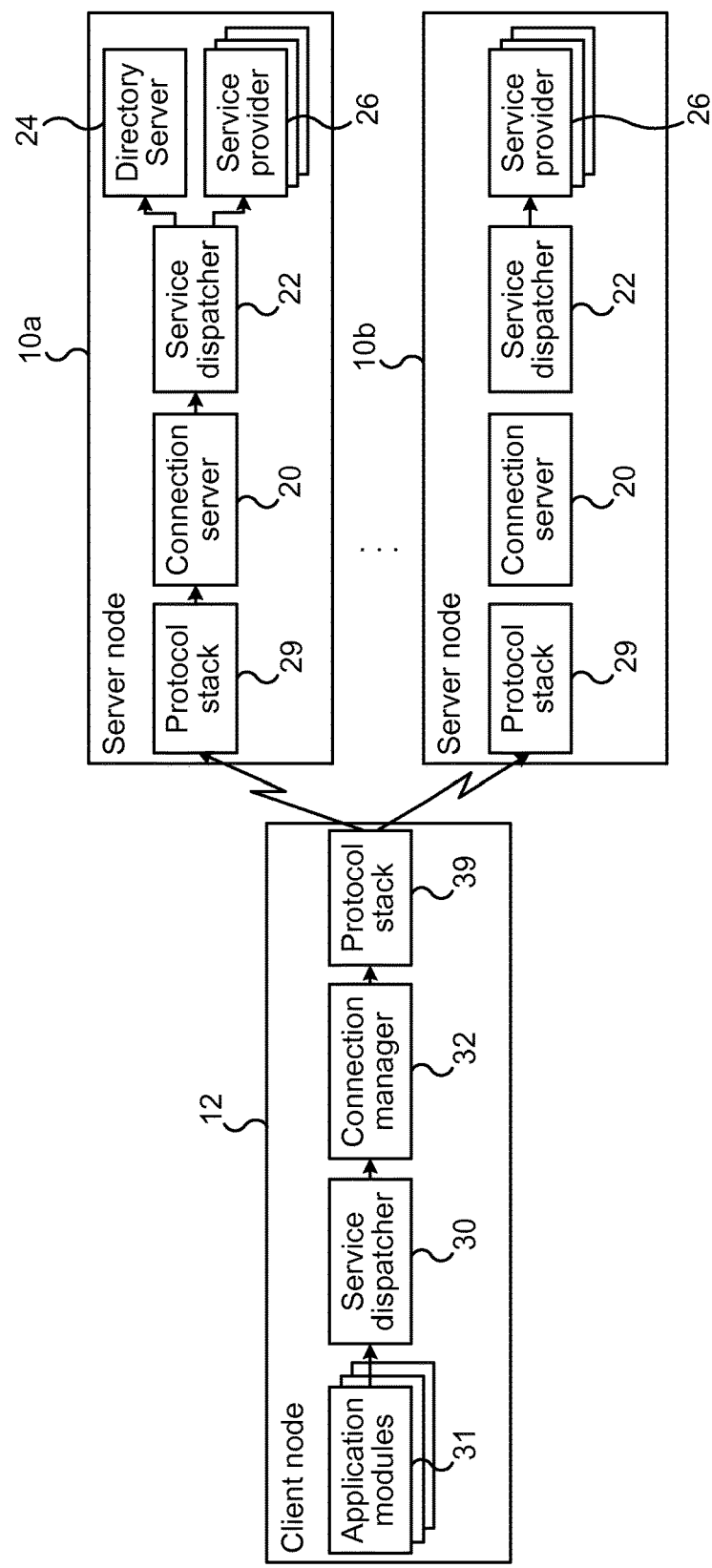
FIG. 6 is a schematic diagram illustrating modules of a client node and server nodes of FIG. 1 in more detail.

FIG. 6 is a schematic diagram illustrating modules of a client node 12 and server nodes 10a-b of same type as in FIG. 1 in more detail.

Here, the client node 12 comprises one or more application modules 31, a service dispatcher module 30, a connection manager module 32 and a protocol stack 39. The dispatcher module 30, connection manager module 32 and protocol stack 39 correspond to the client system services infrastructure 23 of FIG. 4.

A first server node 10a comprises a protocol stack 29, a connection server module 20, a service dispatcher module 22 and one or more service providers 26. Moreover, the first server node 10a comprises a directory server module 24. The protocol stack 29, connection server module 20 and service dispatcher module 22 correspond to the server system services infrastructure 21 of FIG. 4.

The second server node 10b is of the same type as the first server node 10a, except that is doesn't have a directory server module 24.

More server nodes and/or client nodes can be added as necessary.

At least one server node in the system contains a directory server module 24. The directory server module 24 is a service provider that provides directory services. It stores (configurable) information in an object directory about aspect objects and aspects, how they are related to each other, and their locations (i.e. what server node, e.g. identified by a network address) in the system. The directory server module 24 also stores information about user authorisations, i.e. which permissions are granted to users or user groups on each aspect object or group of aspect objects, and about required permissions for the operations that are defined by each aspect type. The directory server module 24 provides various query services to other modules in the system, such as for object and aspect location lookup, for browsing the object directory, and for authorization of operations on aspect objects. The directory server module 24 can be provided in a physically separate directory server or the directory server module can be provided in a server node also housing other services.

The information in the object directory is configuration data that is created by an engineer using an engineering workstation as described above. When this information is ready to be activated, it is transferred (deployed) to runtime directory server module(s) by means of system service requests. When the engineer later makes changes or additions to the aspect objects and aspects, updated information is transferred to the directory server module(s).

Information about the location of each directory server is well known in the system, and can for example be made available to all nodes during system installation and setup. There are several other ways that this information can be established that are familiar to those skilled in the art, e.g. through configuration or by a service discovery mechanism.

Server nodes 10a-b (i.e. nodes that contain service providers 26) also include access to information that allows them to authenticate users. There are several ways by which this information can be provided to servers from a centrally managed directory. An example is LDAP (Lightweight Directory Access Protocol).

Server nodes can optionally be arranged for redundant operation, with two or more computers performing the same services for the same aspect objects, one acting as the active server and the others acting as a stand-by server. As long as the active server is operational, all service requests are directed to it.

If the active server fails, a standby server takes over and becomes the active server.

Also the communication network can be arranged for redundant operation, with one network being the primary network, and the other network being the secondary network.

As mentioned above, an objective is to allow an application module (of a client node) to invoke an operation of another application (service provider of a server node), without either prior knowledge of or the need to first determine the identity or location of the other application. According to embodiments presented herein, this transparency is accomplished by means of a service dispatcher operation, which is implemented using both the client side service dispatcher module 30 and the server side service dispatcher module 22.

This process will be now be described, corresponding to the methods of the flow charts of FIGS. 9 and 10, which is explained later in this document.

To invoke an operation associated with a certain aspect of an aspect object, an application module 31 passes a service request to the client side service dispatcher module 30. The request includes a reference to the requested operation, a reference to the aspect object and a reference to the aspect for which the operation is requested, for example on the form <aspect object identity; aspect identity> where 'aspect object identity' and 'aspect identity' are references that uniquely identify an aspect object and an aspect respectively.

When receiving the request from the application module 31, the client side service dispatcher module 30 first sends a location lookup request for the aspect object and aspect to any directory server module 24 in the system.

The directory server module 24 responds with the location and identity of the service provider 26 responsible for the aspect object and aspect stated in the location lookup request. The client side service dispatcher 24 then uses this information to direct the service request of the client to the relevant server node and service provider.

Optionally, the client side service dispatcher 30 caches information about the location of aspect objects and aspects that it receives in responses from the directory server, thus saving the roundtrip to the directory server and processing for future requests referring to the same objects and aspects. To ensure that information in the cache is always correct, the cache can for example be invalidated when the directory server module 24 is updated with new configuration data from the engineering workstation as described above.

In the server node housing the service provider 26 in question, e.g. the first server node 10*a* in this example, the server side service dispatcher module 22 receives the service request, examines at the aspect object reference and aspect reference, determines the proper service provider 26, and forwards the request to that service provider 26. Information about which service provider 26 is associated with which aspect is determined when service providers 26 are developed, and can for example be held directly by the server side service dispatcher module 22, or be provided by the directory server module 24.

When a service provider 26 receives a request it performs the requested operation on the specified aspect object and aspect. Typically the service provider 26 also sends a response back to the server side service dispatcher module 22, which forwards the response to the client side service dispatcher 30, which in turn forwards it to the requesting application module 31.

In one embodiment, the service request from the application module 31 includes references to multiple aspect objects and aspects that may be located in different server nodes. The client side service dispatcher module 30 then splits the service request into one for each server node, and then merges the responses from the different server nodes into one response that is forwarded to the application module 31.

Similarly, a request received by the server side service dispatcher module 22 from the client node 12 may include references to multiple aspect objects and aspects that are served by different service providers 26 in the same server node. The server side service dispatcher module 22 then splits the service request into one for each service provider 26, and merges the responses from the different service providers 26 into one response that is returned to the client side service dispatcher module 30.

Connections between the connection manager module 32 in the client and the connection server 20 in the server node 10*a, b* can be long-lived, i.e. they are not terminated after a single request-response cycle, but are kept alive for subsequent requests. Connections may be established with all potential server nodes, e.g. directly after system start-up. Alternatively, connections may be established when needed, i.e. when a first service request is to be sent to a server node. The connection manager module 32 can find out which server nodes are available in the system, and any necessary information about them such as their network addresses, by asking the directory server. As mentioned earlier, the locations of directory servers are well known in the system When an application session is established and activated, a user context is created. All subsequent service requests on the same application session relate to this user. Typically, the user is the interactive human user (e.g. operator) that is logged in at the client node 12 and thus directly or indirectly initiates a service request, but the user can also be a system function (i.e. a program) executing in the client node 12. The user is referred to in the system using a user identifier.

The operations of the communication and application layers in the OPC UA architecture are implemented by the connection manager module 32 and the connection server module 20 as follows:

The connection manager module 32 on the client side initiates the establishment of connections (i.e. OPC UA secure channels and application sessions) with connection server modules 20 in relevant server nodes, passing the user's authentication credentials in the connection requests.

The connection server module 20 on the server side receives connection requests. If user authentication is successful, a request is accepted and a connection is established, otherwise it is denied. The user authentication is done against user information stored in the server. There are several ways known in the prior art by which this authentication can be done, e.g. using LDAP.

The connection manager module 32 on the client side supervises all its connections, and transfers connections to a secondary network if the primary network fails or to a standby server node if the active server node fails. In order to minimize the fail-over time, secure channels may be established with both the active and the standby server over both the primary and the secondary network. The fail-over of a lost connection is done by transferring the application session to another secure channel.

The connection manager module 32 sends service requests and receives responses on the established connections.

The connection server module 20 receives the requests and passes them on to the server side service dispatcher module 22, which in turn forwards them the relevant service providers 26 (or to the local connection manager module 32 for forwarding to another server node as shown in FIG. 7 and explained below.

In many cases, the service provider 26 will return a response to the service dispatcher module 22, which passes it to the connection server module 20, which in turn passes it to the client's connection manager module 32 for forwarding to the application module 31. For best efficiency, the server side service dispatcher module 20 may concatenate all responses that result from the same request into one response message.

Before performing the operations specified in a service request, a service provider 26 checks that the user that initiated the service request has authorisation to perform the requested operation on the specified aspect object and aspect. A service provider 26 does this by passing the user's identity, the identity of the aspect object and aspect, and an identifier for the requested operation, to the directory server module 24.

The object directory includes information on what permissions are required for the different operations that are defined by each aspect type. It also includes information about what permissions are granted to each user or user group for each aspect object or group of aspect objects.

The directory server compares the permissions granted to the user with the permissions required for the requested operation on the specified aspect object and aspect. If the granted permissions match the required permissions the directory server returns an access granted message to the service provider 26, otherwise it returns an access denied message.

The protocol stack 29, 39 can be any type of protocol stack that provides reliable transport connections. For example, the protocol stack can support TCP/IP over Ethernet or any of the IEEE 802.11 standards.

Optionally, configuration data includes an affinity configuration for each client node 12 that lists the client's preference order for redundant server nodes. The client's connection manager module 32 will then try to address system service requests to the first server node in the affinity list—this is the client's preferred server node. Affinity thus makes it possible to configure load balancing between different server nodes that serve requests for the same aspect objects. If the client node 12 has no connection to its preferred server node, the connection manager module 32 will select the next node in the affinity list, etc. As soon as the preferred server node becomes available again it is selected, so that the intended load sharing is re-established.

Optionally, the system is configured such that a client node 12 may not have a direct connection to the server that serves a certain request. In such cases, the client side service dispatcher module 30 directs the request to a server to which it has a connection, and the service dispatcher module 22 in that server forwards the request to the destination server node, possibly via other, intermediate server nodes. To determine the first server on the path, the client side service dispatcher module 30 uses system topology information in the object directory. The service dispatcher module 22 in each server along the path redirects the request to the next server, again using system topology information in the Object Directory, until the destination server is reached. The response is sent along the same route, in the opposite direction.

FIG. 7 is a schematic diagram where a client and server node 42 combines the functionality of both a client node 12 and a server node 10 of FIG. 6. Here, the client side service dispatcher 30 and the server side service dispatcher 22 are optionally combined.

This allows the server side service dispatcher module 22 to also check with the directory server that aspect objects and aspects that are referred to by a service request from a client node 12' actually are local to the client and server node 42, and if not, forward the service request to the proper server node 10'.

Local application modules 31 (only one shown in this example) in the client and server node 42 can thus interact with local and/or remote service providers via the local service dispatcher module 22, 30.

FIG. 8 is a schematic diagram illustrating a client and server node 42 similar to the client and server node 42 of FIG. 7 in an embodiment with a multi-process implementation.

Here the server side service dispatcher module 22 is executed in one process in the processor and the client side service dispatcher module 30 is executed in a separate process in the processor along with its respective application module. The different processes communicate using an inter process communication framework 40, e.g. provided by the operating system of the combined client node and server node 42. Moreover, each service provider 26 could execute in a separate process (including the directory server module 24 when present) as well as the client side connection manager module 32 and protocol stack 39.

This increases parallelism and reduces delays and bottlenecks in the request and response flow caused by process switching latency.

Figure 9:
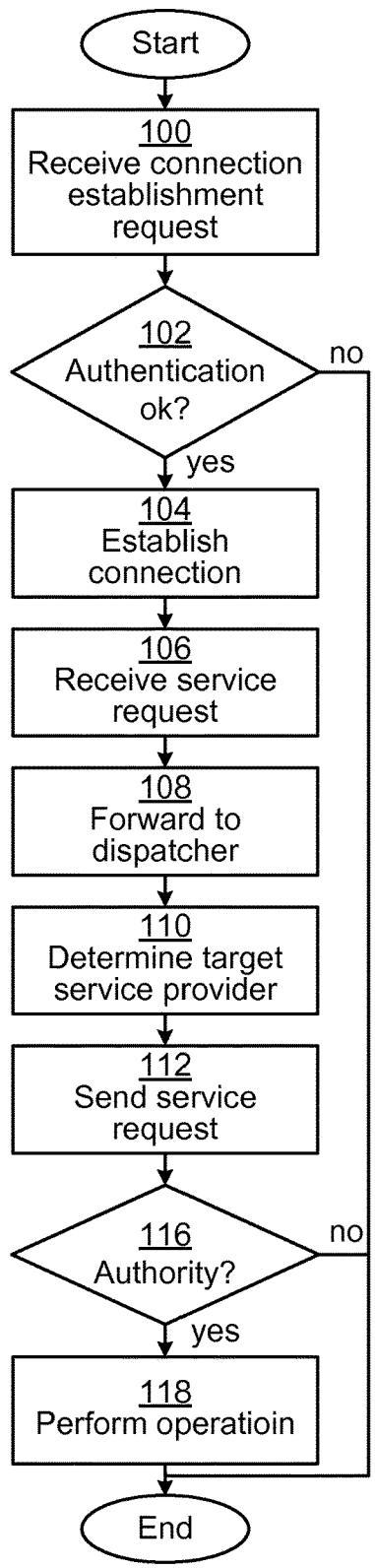
FIG. 9 is a flow chart illustrating a method for controlling real world objects in an industrial installation such as the one illustrated in FIG. 1.

FIG. 9 is a flow chart illustrating a method for controlling real world objects in an industrial installation such as the one illustrated in FIG. 1. The method is illustrated in the server node 10. References are also made to the modules of FIGS. 5-8.

In a receive connection establishment request step 100, a connection establishment request comprising a user identity (optionally comprising full credentials) is received. This step is performed in the connection server module 20.

In a conditional authentication ok step 102, the user identity is authenticated. If this results in a granted authentication, the method proceeds to an establish connection step 104. Otherwise, the method ends. This step is performed in the connection server module 20.

In the establish connection step 104, a connection is established. This connection is on application layer level (see FIG. 2 between the client application layer 6 and the server application layer 8) and is associated with the user identity of the connection establishment request. This step is performed in the connection server module 20.

In a receive service request step 106, a service request is received on the established connection, wherein the service request comprises a reference to an aspect object and a reference to an aspect of the aspect object. This step is performed in the connection server module 20.

In a forward to dispatcher step 108, the service request and the user identity is forwarded to the service dispatcher module 22. This step is performed in the connection server module 20.

In a determine target service provider step 110, a target service provider 26 is determined from the reference to the aspect object and/or aspect. This is performed by querying a directory server module 24. This step is performed in the service dispatch module 22.

In a send service request step 112, the service request and the user identity are passed to the target service provider. This step is performed in the service dispatch module 22.

In a conditional authority step 116, authority for the user identity to invoke the operation defined by aspect is checked. If this results in that the user identity is authorised, the method proceeds to a perform operation step 118. Otherwise, the method ends. This step is performed in the service provider 26.

In the perform operation step 118, an operation defined by the aspect is performed. This step is performed in the service provider 26 and may also comprise sending a response back to the client node 12.

Figure 10:
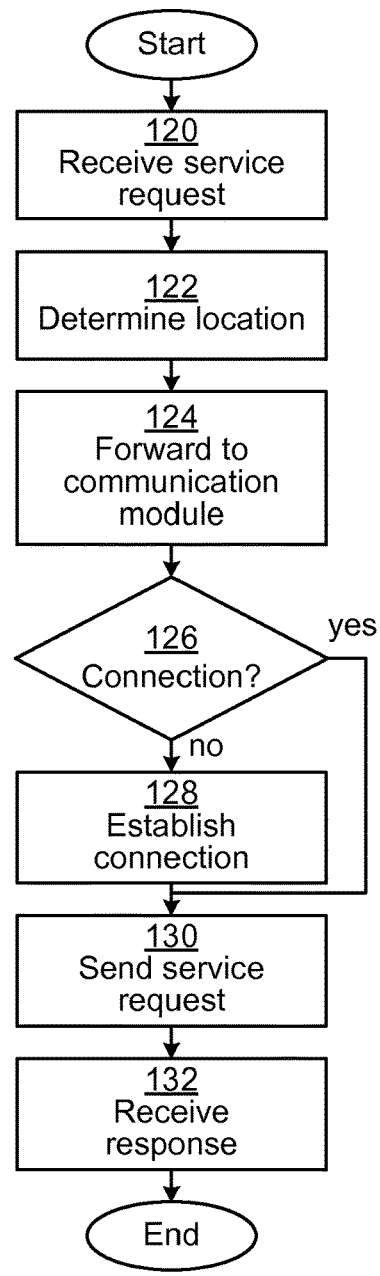
FIG. 10 is a flow chart illustrating a method for controlling real world objects in an industrial installation such as the one illustrated in FIG. 1.

FIG. 10 is a flow chart illustrating a method for controlling real world objects in an industrial installation such as the one illustrated in FIG. 1. The method is illustrated in the client node 12. References are also made to the modules of FIGS. 5-8.

In a receive service request step 120, a service request is received from an application module 31 of the client node. The service request comprises a reference to an aspect object and a reference to an aspect of the aspect object. This step is performed in the service dispatcher module 30.

In a determine location step 122, a location of a server node 10 is determined based on the references to the aspect object and/or the aspect. This step is performed in the service dispatcher module 30.

In a forward to communication module step 124, the service request, a reference to the location of the server node 10 and a user identity is forwarded to the connection manager module 32. This step is performed in the service dispatcher module 30.

In a conditional connection step 126 it is checked if a connection is established with the server node. If this a connection is established, the method proceeds to a send service request step 130. Otherwise, the method proceeds to an establish connection step 128. This step is performed in the connection manager module 32.

In the establish connection step 128, a connection establishment request comprising the user identity is sent to the server node 10. This step is performed in the connection manager module 32.

In the send service request step 130, the service request is sent to the server node. This step is performed in the connection manager module 32.

In a receive response step 132, a response is received from the server. This step is performed in the connection manager module 32.

Figure 11:
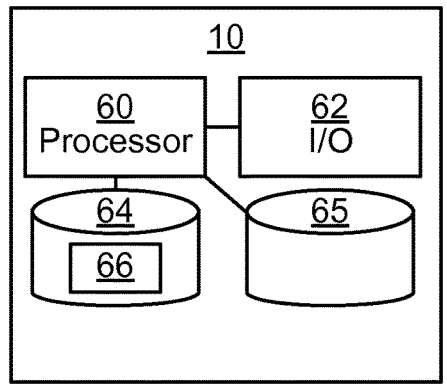
FIG. 11 is a schematic diagram showing some components of an embodiment of the server node 10 of FIG. 1.

FIG. 11 is a schematic diagram showing some components of an embodiment of the server node 10 of FIG. 1.

A processor 60 is provided using any combination of one or more of a suitable central processing unit (CPU), multiprocessor, microcontroller, digital signal processor (DSP), etc., capable of executing software instructions 66 stored in a memory 64, which can thus be a computer program product. The processor 60 can be configured to execute the method described with reference to FIG. 9 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory.

The server node 10 further comprises an I/O interface 62 for communicating with other entities such as the client node 12 or other server nodes. Optionally, the I/O interface 62 also comprises a user interface for operator control of the server node 10 itself.

Other components of the server node 10 are omitted here in order not to obscure the concepts presented herein.

Figure 12:
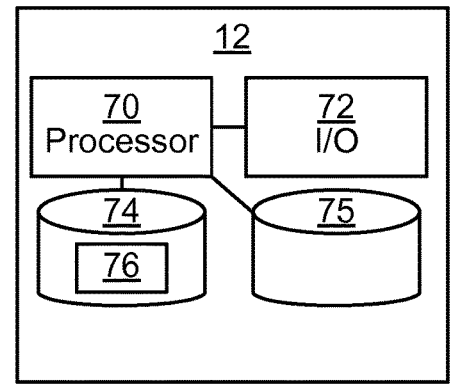
FIG. 12 is a schematic diagram showing some components of an embodiment of the client node 10 of FIG. 1.

FIG. 12 is a schematic diagram showing some components of an embodiment of the client node 10 of FIG. 1.

A processor 70 is provided using any combination of one or more of a suitable central processing unit (CPU), multiprocessor, microcontroller, digital signal processor (DSP), etc., capable of executing software instructions 76 stored in a memory 74, which can thus be a computer program product. The processor 70 can be configured to execute the method described with reference to FIG. 9 above.

The memory 74 can be any combination of read and write memory (RAM) and read only memory (ROM). The memory 74 also comprises persistent storage, which, for example, can be any single one or combination of magnetic memory, optical memory, solid state memory or even remotely mounted memory.

A data memory 75 can be any combination of read and write memory (RAM) and read only memory (ROM). The data memory 75 may also comprise persistent storage, which, for example, can be any single one or combination of magnetic memory, optical memory, solid state memory or even remotely mounted memory.

The client node 10 further comprises an I/O interface 72 for communicating with other entities such as the server node 12. The I/O interface 72 also comprises a user interface for operator control of the client node 12 itself.

Other components of the client node 12 are omitted here in order not to obscure the concepts presented herein.

Figure 13:
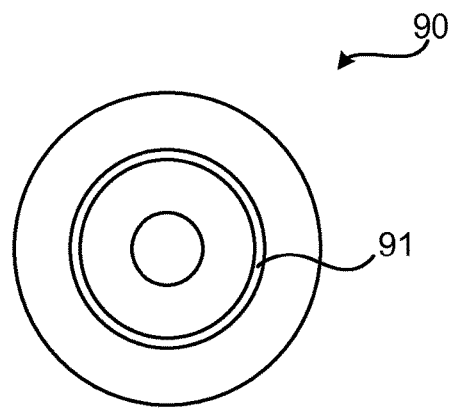
FIG. 13 shows one example of a computer program product comprising computer readable means.

FIG. 13 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 11 or the computer program product 76 of FIG. 12. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling real world objects in an industrial installation, the method being performed in a server node and comprising the steps of:
   receiving, in a connection server module, a connection establishment request comprising a user identity;
   authenticating, in the connection server module, the user identity;
   establishing, in the connection server module, a connection and associating the connection with the user identity, only when the authentication is successful;
   receiving, in the connection server module, a service request on the established connection, wherein the service request comprises a reference to an aspect object and a reference to an aspect of the aspect object, wherein the aspect object is a software object representing one of the real world objects, and the aspect of the aspect object defines an operation associated with the real world object;
   forwarding, in the connection server module, the service request and the user identity to a service dispatcher module;
   determining, in the service dispatcher module, a target service provider from the reference to the aspect of the aspect object; and
   sending, in the service dispatcher module, the service request and the user identity to the target service provider.

2. The method according to claim 1, wherein the step of determining a target service provider comprises querying a directory server module.

3. The method according to claim 1, further comprising the steps of:
   checking, in a service provider module corresponding to the target service provider, authority for the user identity to invoke the operation defined by the aspect of the aspect object; and
   performing, in the service provider module, an operation defined by the aspect of the aspect object, only when the user identity has authority to invoke the operation defined by the aspect of the aspect object.

4. The method according to claim 3, wherein the step of checking authority comprises sending an authorisation request to the directory server module and receiving a response from the directory server module, wherein the authorisation request comprises the user identity, the reference to the aspect object and the reference to the aspect of the aspect object.

5. The method according to claim 1, wherein the directory server module is provided in a directory server which is physically separate from the server node.

6. The method according to claim 1, wherein, in the step of receiving a connection establishment request, the connection establishment request comprises authentication credentials comprising the user identity.

7. A server node for controlling real world objects in an industrial installation, the server node comprising:
a processor; and
a memory storing a connection server module and a service dispatcher module;
wherein the connection server module stores instructions that, when executed by the processor, causes the server node to: receive a connection establishment request comprising a user identity; authenticate the user identity; establish a connection and associating the connection with the user identity, only when the authentication is successful; receive a service request on the established connection, wherein the service request comprises a reference to an aspect object and a reference to an aspect of the aspect object, wherein the aspect object is a software object representing one of the real world objects, and the aspect of the aspect object defines an operation associated with the real world object; and forward the service request and the user identity to a service dispatcher module;
and the service dispatcher module stores instructions that, when executed by the processor, causes the server node to: determine a target service provider from the reference to the aspect of the aspect object; and send the service request and the user identity to the target service provider.

8. The server node according to claim 7, wherein the instructions to determine a target service provider comprise instructions that, when executed by the processor, causes the server node to: query a directory server module.

9. The server node according to claim 7, wherein the memory further stores a service provider module corresponding to the target service provider, the service provider module comprising instructions that, when executed by the processor, causes the server node to: check authority for the user identity to invoke the operation defined by aspect; and perform an operation defined by the aspect of the aspect object, only when the user identity has authority to invoke the operation defined by aspect.

10. The server node according to claim 9, wherein the instructions to check authority comprise instructions that, when executed by the processor, causes the server node to send an authorisation request to the directory server module and receive a response from the directory server module, wherein the authorisation request comprises the user identity, the reference to the aspect object and the reference to the aspect of the aspect object.

11. The server node according to claim 7, wherein the directory server module is provided in a directory server which is physically separate from the server node.

12. The server node according to claim 7, wherein the connection establishment request comprises authentication credentials comprising the user identity.

13. The server node according to claim 7, wherein a capacity of each module is independently configurable.

14. A non-statutory computer readable medium for controlling real world objects in an industrial installation, the non-statutory computer readable medium comprising computer program code which, when run on a server node causes the server node to:
receive, in a connection server module, a connection establishment request comprising a user identity;
authenticate, in the connection server module, the user identity;
establish, in the connection server module, a connection and associating the connection with the user identity, only when the authentication is successful;
receive, in the connection server module, a service request on the established connection, wherein the service request comprises a reference to an aspect object and a reference to an aspect of the aspect object, wherein the aspect object is a software object representing one of the real world objects, and the aspect of the aspect object defines an operation associated with the real world object;
forward, in the connection server module, the service request and the user identity to a service dispatcher module;
determine, in the service dispatcher module, a target service provider from the reference to the aspect of the aspect object; and
send, in the service dispatcher module, the service request and the user identity to the target service provider.

15. A computer program product comprising a computer program according to claim 14 and a computer readable means on which the computer program is stored.

16. A method for controlling real world objects in an industrial installation, the method being performed in a client node and comprising the steps of:
receiving, in a service dispatcher module, a service request from an application module of the client node, wherein the service request comprises a reference to an aspect object and a reference to an aspect of the aspect object, wherein the aspect object is a software object representing one of the real world objects, and the aspect of the aspect object defines an operation associated with the real world object;
determining, in the service dispatcher module a location of a server node based on the reference to the aspect object and the reference to the aspect of the aspect object;
forwarding, in the service dispatcher module, the service request, a reference to the location of the server node and a user identity to a connection manager module;
checking, in the connection manager module, if a connection is established with the server node;
sending, in the connection manager module, a connection establishment request comprising the user identity when no connection is established with the server node; and
sending, in the connection manager module, the service request to the server node when a connection with the server node is established.

17. The method according to claim 16, wherein the step of determining a location comprises determining the location of the server node by querying a directory server.

18. The method according to claim 17, further comprising the step of caching the location of the server node for use for future service requests for the aspect object and the aspect of the aspect object.

19. A client node for controlling real world objects in an industrial installation, the client node comprising:

a processor; and a memory storing a service dispatcher module and a connection manager module;

wherein the service dispatcher module stores instructions that, when executed by the processor, causes the client node to: receive a service request from an application module of the client node, wherein the service request comprises a reference to an aspect object and a reference to an aspect of the aspect object, wherein the aspect object is a software object representing one of the real world objects, and the aspect of the aspect object defines an operation associated with the real world object; determine a location of a server node based on the reference to the aspect object and the reference to the aspect of the aspect object; and forward the service request, a reference to the location of the server node and a user identity to a connection manager module;

and the connection manager module stores instructions that, when executed by the processor, causes the client node to: check if a connection is established with the server node; send a connection establishment request comprising the user identity when no connection is established with the server node; and send the service request to the server node when a connection with the server node is established.

20. The client node according to claim 19, wherein the step of determining a location comprises determining the location of the server node by querying a directory server.

21. The client node according to claim 20, further comprising the step of caching the location of the server node for use for future service requests for the aspect object and the aspect of the aspect object.

22. The client node according to claim 19, wherein a capacity of each module is independently configurable.

23. A non-statutory computer readable medium for controlling real world objects in an industrial installation, the non-statutory computer readable medium comprising computer program code which, when run on a client node causes the client node to:

receive, in a service dispatcher module, a service request from an application module of the client node, wherein the service request comprises a reference to an aspect object and a reference to an aspect of the aspect object, wherein the aspect object is a software object representing one of the real world objects, and the aspect of the aspect object defines an operation associated with the real world object;

determine, in the service dispatcher module a location of a server node based on the reference to the aspect object and the reference to the aspect of the aspect object;

forward, in the service dispatcher module, the service request, a reference to the location of the server node and a user identity to a connection manager module;

check, in the connection manager module, if a connection is established with the server node;

send, in the connection manager module, a connection establishment request comprising the user identity when no connection is established with the server node; and send, in the connection manager module, the service request to the server node when a connection with the server node is established.

* * * * *